(12) United States Patent
Gottin et al.

(10) Patent No.: US 10,853,718 B2
(45) Date of Patent: Dec. 1, 2020

(54) PREDICTING TIME-TO-FINISH OF A WORKFLOW USING DEEP NEURAL NETWORK WITH BIANGULAR ACTIVATION FUNCTIONS

(71) Applicant: EMC IP Holding Company LLC, Hopkinton, MA (US)

(72) Inventors: Vinícius Michel Gottin, Rio de Janeiro (BR); Alex Laier Bordignon, Niterói (BR)

(73) Assignee: EMC IP Holding Company LLC, Hopkinton, MA (US)

(*) Notice: Subject to any disclaimer, the term of this patent is extended or adjusted under 35 U.S.C. 154(b) by 118 days.

(21) Appl. No.: 16/040,771

(22) Filed: Jul. 20, 2018

(65) Prior Publication Data

US 2020/0026570 A1 Jan. 23, 2020

(51) Int. Cl.
*G06N 3/02* (2006.01)
*G06N 3/00* (2006.01)
(Continued)

(52) U.S. Cl.
CPC ............. *G06N 3/02* (2013.01); *G06F 9/455* (2013.01); *G06F 9/45533* (2013.01); *G06F 9/48* (2013.01);
(Continued)

(58) Field of Classification Search
CPC ... G06F 9/48; G06F 9/50; G06F 9/455; G06F 9/4558; G06F 9/4806; G06F 9/4843;
(Continued)

(56) References Cited

U.S. PATENT DOCUMENTS 9,189,543 B2 * 11/2015 Badhe ............... G06Q 10/0631
10,184,320 B2 * 1/2019 Al-Turki ................ E21B 43/00
(Continued)

OTHER PUBLICATIONS

Sibi et al, "Analysis of Different Activation Functions Using Back Propagation Neural Networks", Journal of Theoretical and Applied Information Technology, Jan. 31, 2013. vol. 47 No. 3, pp. 1264-1268 (Year: 2013).*
(Continued)

*Primary Examiner* — Charles M Swift
(74) *Attorney, Agent, or Firm* — Ryan, Mason & Lewis, LLP (57) ABSTRACT

Techniques are provided for predicting a time-to-finish of at least one workflow in a shared computing environment using a deep neural network with a biangular activation function. An exemplary method comprises: obtaining a specification of an executing workflow of multiple concurrent workflows in a shared computing environment, wherein the specification comprises states of past executions of the executing workflow; obtaining a trained deep neural network, wherein the trained deep neural network is trained to predict one or more future states of the executing workflow using the states of past executions and wherein the trained deep neural network employs a biangular activation function comprising multiple parameters that define a position and a slope associated with two angles of the biangular activation function for a range of input values; and estimating, using the at least one trained deep neural network, a time-to-finish of the executing workflow of the multiple concurrent workflows.

20 Claims, 8 Drawing Sheets

US 10,853,718 B2

Page 2

(51) Int. Cl.
G06N 3/08 (2006.01)
G06F 9/48 (2006.01)
G06F 9/50 (2006.01)
G06F 9/455 (2018.01)
G06N 3/04 (2006.01)

(52) U.S. Cl.
CPC .......... G06F 9/4806 (2013.01); G06F 9/4843 (2013.01); G06F 9/4881 (2013.01); G06F 9/50 (2013.01); G06F 9/5005 (2013.01); G06F 9/5027 (2013.01); G06F 9/5038 (2013.01); G06F 9/5061 (2013.01); G06F 9/5077 (2013.01); G06N 3/00 (2013.01); G06N 3/0481 (2013.01); G06N 3/08 (2013.01); G06F 2009/45575 (2013.01); G06F 2009/45591 (2013.01)

(58) Field of Classification Search
CPC .... G06F 9/4881; G06F 9/5005; G06F 9/5027; G06F 9/5061; G06F 9/5077; G06N 3/00; G06N 3/02; G06N 3/0481; G06N 3/08
See application file for complete search history.

(56) References Cited

U.S. PATENT DOCUMENTS

| | | | | |
|---|---|---|---|---|
| 2013/0212277 | A1* | 8/2013 | Bodik | G06F 9/4887 709/226 |
| 2015/0025931 | A1* | 1/2015 | Li | G06Q 10/0633 705/7.27 |
| 2015/0339572 | A1* | 11/2015 | Achin | G06N 5/02 706/46 |
| 2016/0098292 | A1* | 4/2016 | Boutin | G06F 9/505 718/104 |
| 2018/0307998 | A1* | 10/2018 | Strachan | G06F 9/44 |
| 2019/0026663 | A1* | 1/2019 | Homeyer | G06Q 10/06316 |

OTHER PUBLICATIONS

Nicolae et al, "PLU: The Piecewise Linear Unit Activation Function", University of Washington, Seattle, Sep. 3, 2018, pp. 1-6 (Year: 2018).*
Adeel Ahmad, "An overview of activation functions in neural networks", Githhub, Nov. 13, 2017, pp. 1-14 (Year: 2017).*
Phuc Truong, "Activation Functions—When to use them and how could they perform", Medium, Apr. 16, 2018, pp. 1-15 (Year: 2018).*
U.S. Appl. No. 15/364,449 entitled, "Snapshots to Train Prediction Models and Optimize Workflow Execution", filed Nov. 30, 2016.
U.S. Appl. No. 15/961,033 entitled, "Deep Reinforcement Learning for Workflow Optimization", filed Apr. 24, 2018.
Glorot et al., "Deep sparse rectifier neural networks," AISTATS, 2011.
Forest et al., "Learning activation functions to improve deep neural networks," arXiv preprint, 2014.
U.S. Appl. No. 15/800,587 entitled, "Simulation-Based Online Optimization of Workflows", filed Nov. 1, 2017.
Kingma et al., "Adam: A method for stochastic optimization," arXiv preprint, 2014.

* cited by examiner

PREDICTING TIME-TO-FINISH OF A WORKFLOW USING DEEP NEURAL NETWORK WITH BIANGULAR ACTIVATION FUNCTIONS

FIELD

The field relates generally to the processing of workloads in a shared computing environment.

BACKGROUND

Modern industrial systems rely heavily on automated workflows to execute tasks, such as data mining, pattern recognition and image processing tasks. Such workflows are typically executed in a shared infrastructure. The sharing of the infrastructure resources is a non-trivial task, which typically requires the orchestration of virtual machines whose setup directly impacts the time and the cost to execute the workflows. This problem is particularly relevant in the context of Infrastructure and Platform as a Service providers, where providing scalability and efficient resource allocation for the execution of these workflows is important in order to save costs.

A need exists for techniques for estimating a time-to-finish of at least one workflow executing in a shared computing environment.

SUMMARY

Illustrative embodiments of the present disclosure predict a time-to-finish of at least one workflow in a shared computing environment using a deep neural network with a biangular activation function. In one embodiment, an exemplary method comprises: obtaining a specification of at least one executing workflow of a plurality of concurrent workflows in a shared computing environment, wherein the specification comprises a plurality of states of past executions of the at least one executing workflow; obtaining at least one trained deep neural network, wherein the at least one trained deep neural network is trained to predict one or more future states of the at least one executing workflow using the plurality of states of past executions and wherein the at least one trained deep neural network employs a biangular activation function comprising multiple parameters that define a position and a slope associated with two angles of the biangular activation function for a range of input values; and estimating, using the at least one trained deep neural network, a time-to-finish of the at least one executing workflow of the plurality of concurrent workflows. The four parameters are learned during a training phase or can be fixed during an initialization phase based on a priori information.

In some embodiments, the at least one trained deep neural network is updated using one or more snapshots collected during an execution of a new instance of the at least one executing workflow.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for predicting a time-to-finish of at least one workflow in a shared computing environment using a deep neural network with a biangular activation function.

One or more embodiments provide techniques for predicting or estimating a time-to-finish of a given computation, given certain resources in a specific environment. The prediction of a time-to-finish for a given computation is often important, for example, when scheduling of tasks and/or when performing a resource allocation. In some embodiments, deep neural network models are trained in the context of the workflow optimization problem.

The disclosed techniques for estimating a time-to-finish of workloads in a shared computing environment, in some embodiments, employ a deep neural network with biangular activation functions, such as a disclosed Biangular Leaky Rectified Linear Unit (BILU) activation function. It has been found that the disclosed BILU activation function is well-suited for the prediction of the time-to-finish of workflows in such shared infrastructure environments.

In one or more embodiments, the disclosed BILU activation function can be considered a generalization of existing activation functions such as the Rectified Linear Unit (ReLU), but with an adaptable sensitivity to input values substantially close to zero. It has been found that a neural network structure with a BILU activation function accelerates the learning process and improves the accuracy of the predictions, relative to neural network structures with conventional activation functions.

U.S. patent application Ser. No. 15/364,449, filed Nov. 30, 2016, entitled "Snapshots to Train Prediction Models and Optimize Workflow Execution," incorporated by reference herein in its entirety, employs a deep machine learning model trained on past executed instances that is capable of predicting a certain cost in executing a workload under a determined infrastructure.

U.S. patent application Ser. No. 15/961,033, filed Apr. 24, 2018, entitled "Deep Reinforcement Learning for Workflow Optimization," incorporated by reference herein in its entirety, employs one or more deep reinforcement learning agents that balance an exploration of new configurations and an exploitation of known resource allocation policies.

In the context of machine learning to predict execution characteristics of workflows, such as a time-to-finish of one or more workflows, real-time collected telemetry data is often provided as an input. The collected telemetry data, however, does not typically have a characterization of the noise contained therein, which may lead to problems of convergence of the neural network.

When defining an activation function with parameters to be learned during a training phase, there may be a problem of defining a good balance between a number of parameters for the activation function and an increase of accuracy and complexity of the model. If the number of model parameters is increased, the complexity of the training process is generally also increased. This tradeoff highlights the need to define a function that is general enough with respect to the minimum number of parameters.

Provenance Capture and Feature Vector Composition

Figure 1:
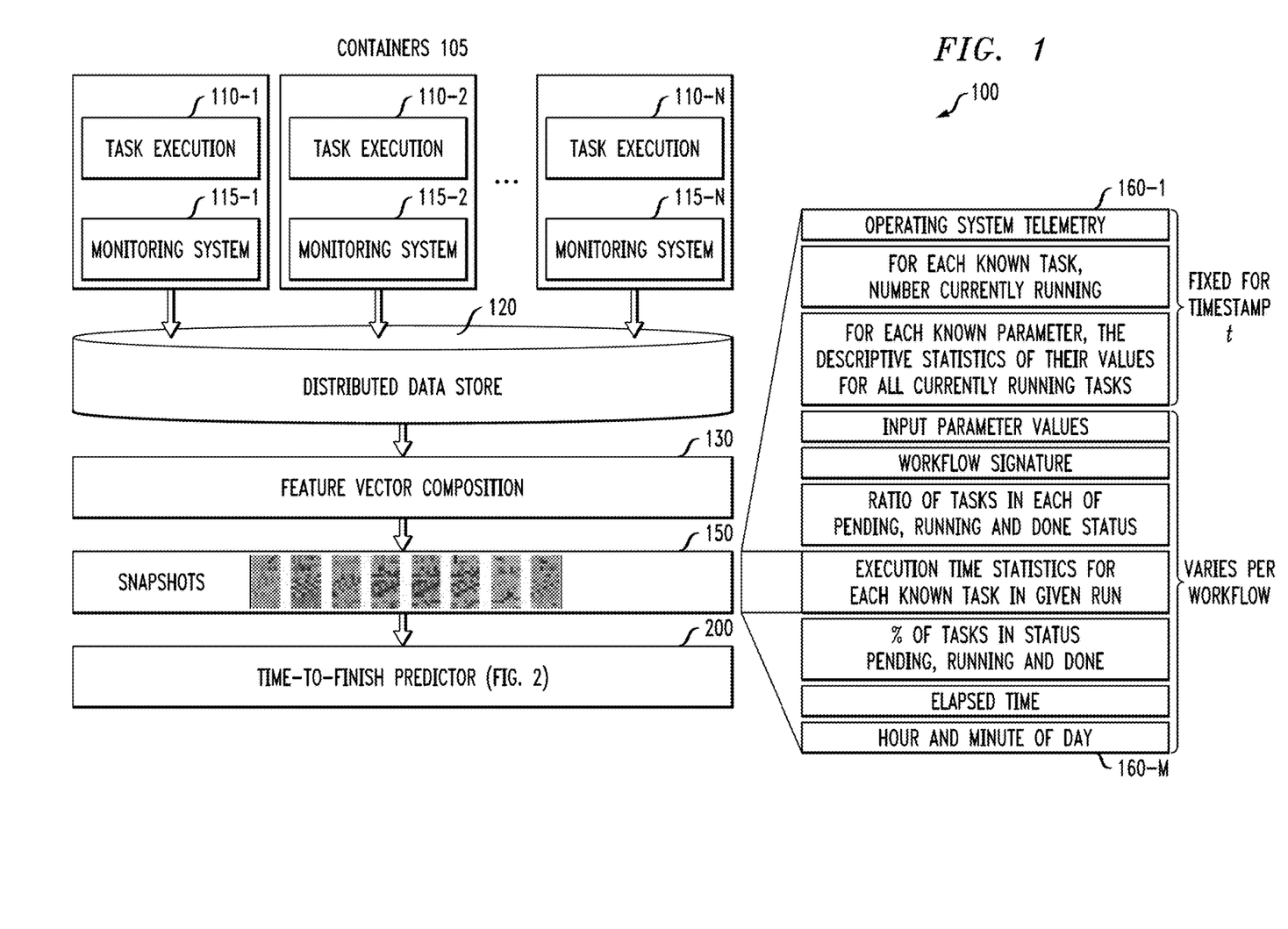
FIG. 1 illustrates an exemplary process for capturing provenance data for a plurality of tasks of a workflow and for predicting a time-to-finish of the workflow, according to some embodiments.

FIG. 1 illustrates an exemplary process 100 for capturing provenance data for a plurality of tasks 110-1 through 110-N of a workflow and for predicting a time-to-finish of at least one workflow, according to some embodiments. As shown in FIG. 1, the plurality of tasks 110-1 through 110-N execute on one or more containers 105. The plurality of tasks 110-1 through 110-N are monitored by corresponding monitoring systems 115-1 through 115-N which capture the provenance data. The monitoring systems 115-1 through 115-N store the collected provenance data in a distributed data store 120 in the embodiment of FIG. 1.

A feature vector composition process 130 is applied to the provenance data in the distributed data store 120 to extract a plurality of the extracted features 160-1 through 160-M from the provenance data and to generate one or more snapshots 150 comprising the extracted features 160-1 through 160-M. FIG. 1 illustrates one exemplary configuration of features 160 that comprise a snapshot 150.

In the example of FIG. 1, the exemplary snapshot 150 comprises the following exemplary data commonly in the exemplary snapshot 150 extracted from workflow executions: operating system telemetry; for each known task, the number currently running; for each known parameter, the descriptive statistics of their values for all currently running tasks; input parameter values; workflow signature; ratio of tasks in pending, running and done status; execution time statistics for each known task in a given run; percentage (%) of tasks with status of pending, running and done; elapsed time; and actual time (e.g., hour and minute of day).

As shown in FIG. 1, an exemplary time-to-finish predictor 200, as discussed further below in conjunction with FIGS. 2 through 5, processes the snapshots 150 to predict the time-to-finish of the tasks 110-1 through 110-N of the at least one workflow, according to some embodiments.

As used herein, the provenance data optionally includes telemetry data.

An exemplary snapshot of a workflow w at instant t includes provenance data of the workflow w at that instant, as well as contextual information of all other workflows running concurrently with w. The set of workflows running concurrently is referred as a batch of workflows.

Generally, one or more embodiments of the disclosure manage an execution of workflows while orchestrating the collection of snapshots 150 as time-stamped contextual provenance and telemetry information datasets. These snapshots comprise a collection of provenance and telemetry data. The collected features in a snapshot 150 allow characteristics of the workflow to be predicted and to make predictions in real time during future executions.

In one or more embodiments, deep neural networks (DNN) with a biangular activation function are employed to learn the substantially most relevant relationships among the available features. In particular, the disclosed DNNs with biangular activation functions are employed to predict a time-to-finish of a running workflow instance.

Figure 2:
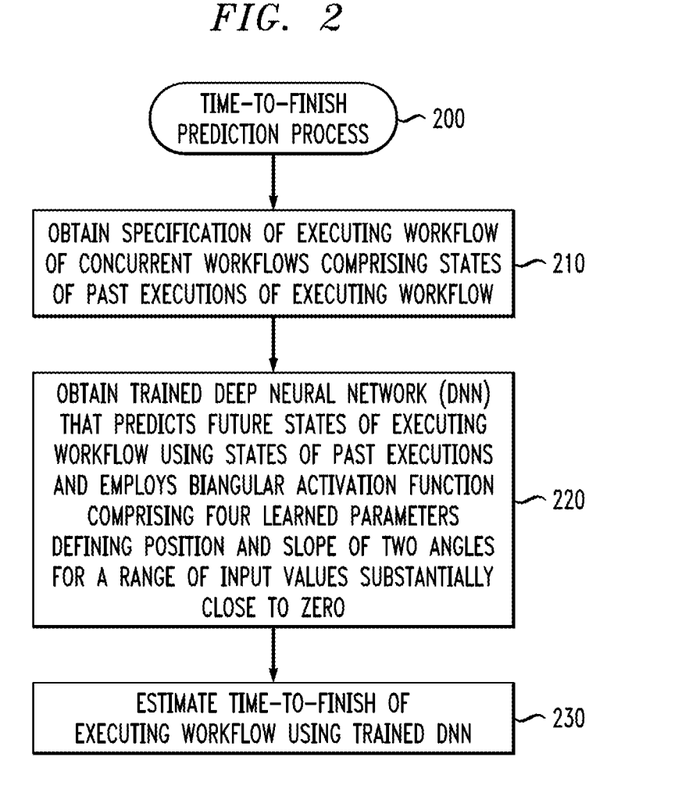
FIG. 2 is a flow chart illustrating an exemplary implementation of a time-to-finish prediction process that may be performed by the time-to-finish predictor of FIG. 1, according to one embodiment of the disclosure.

FIG. 2 is a flow chart illustrating an exemplary implementation of a time-to-finish prediction process 200 that may be performed by the time-to-finish predictor of FIG. 1, according to one embodiment of the disclosure. As shown in FIG. 2, the exemplary time-to-finish prediction process 200 initially obtains a specification of at least one executing workflow of a plurality of concurrent workflows in a shared computing environment during step 210. Generally, the specification comprises a plurality of states of past executions of the at least one executing workflow.

Thereafter, the exemplary time-to-finish prediction process 200 obtains a trained DNN during step 220. The exemplary trained DNN is trained to predict one or more future states of the at least one executing workflow using the plurality of states of past executions. In addition, the exemplary trained DNN employs a biangular activation function, as discussed further below in conjunction with FIG. 5, comprising four learned parameters that define a position and a slope of two angles for a range of input values substantially close to zero.

Finally, the exemplary time-to-finish prediction process 200 uses the trained DNN during step 230 to estimate a time-to-finish of the at least one executing workflow of the plurality of concurrent workflows.

Figure 3:
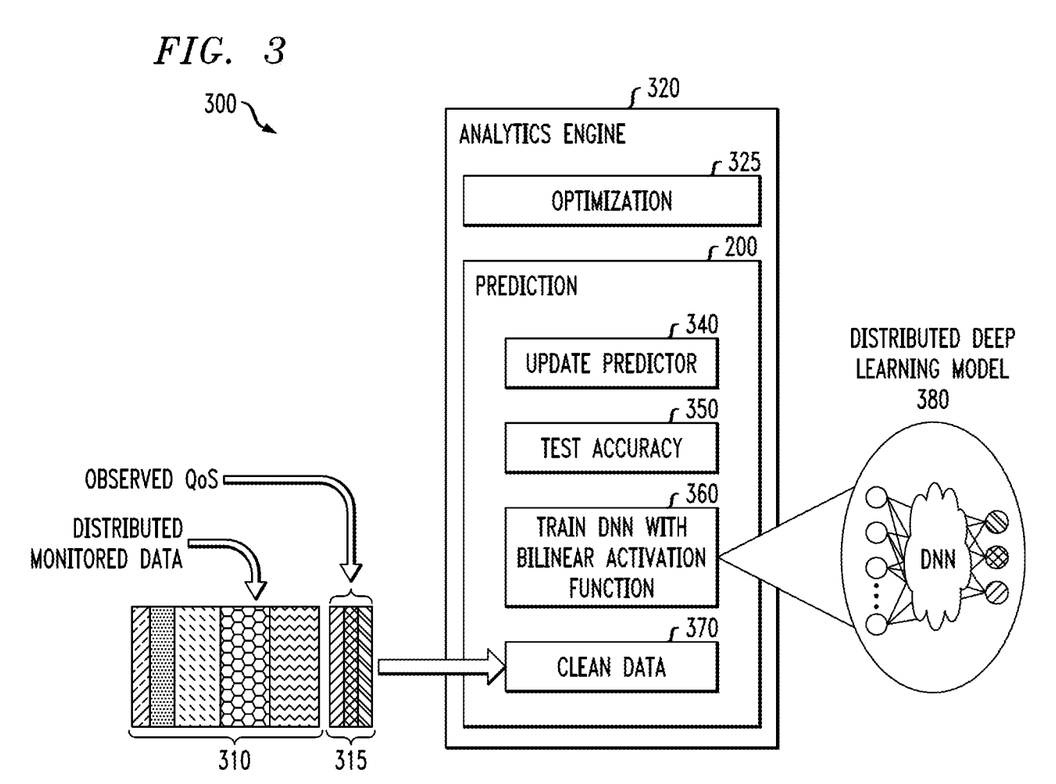
FIG. 3 illustrates an exemplary implementation of a training process of the time-to-finish predictor of FIG. 1, according to some embodiments.

FIG. 3 illustrates an exemplary implementation of a training process 300 of the time-to-finish predictor 200 of FIG. 1, according to some embodiments. Generally, the exemplary training process 300 explores a hierarchical structure of the workflows in the shared computing environment. As shown in FIG. 3, the exemplary training process 300 processes distributed monitored data 310, such as the snapshots 150, and one or more observed quality of service (QoS) metrics 315. An exemplary analytics engine 320 comprises a prediction module 200 (e.g., time-to-finish prediction module and process 200 of FIGS. 1 and 2) and an optimization module 325. The exemplary optimization module 325 may be employed, for example, to perform a resource allocation within the shared computing environment.

The exemplary time-to-finish prediction module 200 employs a clean data module 370 to clean the input data 310, 315 and a training module 360 to train the DNN with the biangular activation function. The training can be done from the start, generating a new DNN, or incrementally, refining the weights and biases of the current DNN with new monitored data, in a known manner.

After the training module 360 has completed the training of the DNN (e.g., utilizing a distributed deep learning model 380), the accuracy of the DNN is evaluated by a test accuracy module 350 using a test dataset, in a known manner. If the test accuracy result is satisfactory, the predictor is updated with the new model by module 340. Metrics will optionally continue to be collected during production runs within a data center. An offline refinement of the model optionally produces a parameterization of workflows substantially optimized to the data access and data flows of different users and/or clients.

Time-to-Finish Using DNNs with Biangular Activation Functions

As noted above, one or more embodiments generate predictions of future states of a new running workflow instance, considering a shared environment, to enable and enhance workflow optimization techniques. In particular, techniques are provided to improve the training of an accurate DNN predictor of time-to-finish. As noted above, the exemplary input data in some embodiments comprises snapshots 150 of past similar workflow instances, as well as snapshot samples collected at run-time during the execution of a new workflow instance.

Figure 4:
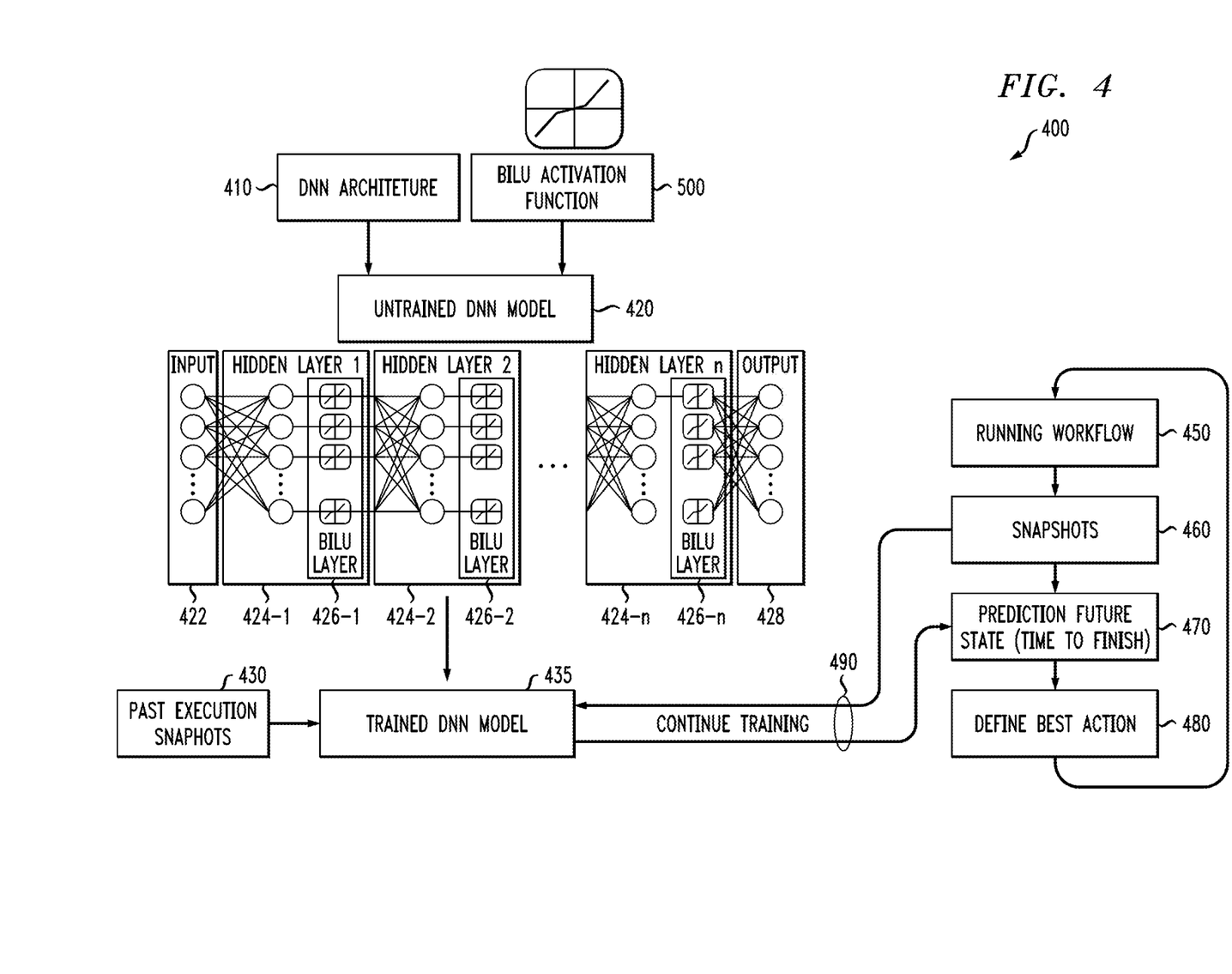
FIG. 4 illustrates an exemplary time-to-finish predictor, according to some embodiments of the disclosure.

FIG. 4 illustrates an exemplary time-to-finish predictor 400, according to some embodiments of the disclosure. As shown in FIG. 4, the exemplary time-to-finish predictor 400 comprises a trained Deep-Neural Network model 435 that predicts a time-to-finish of a new running workflow instance 450 based on past execution snapshots 430 used as training data, and snapshots 460 used as observation samples.

In order to define a DNN model, it is often necessary to define an architecture and the activation functions of the DNN model before a training process is initiated. As shown in FIG. 4, the exemplary time-to-finish predictor 400 comprises a DNN architecture 410, in a known manner, and a biangular activation function, such as a BILU activation function 500, as discussed further below in conjunction with FIG. 5.

Figure 5:
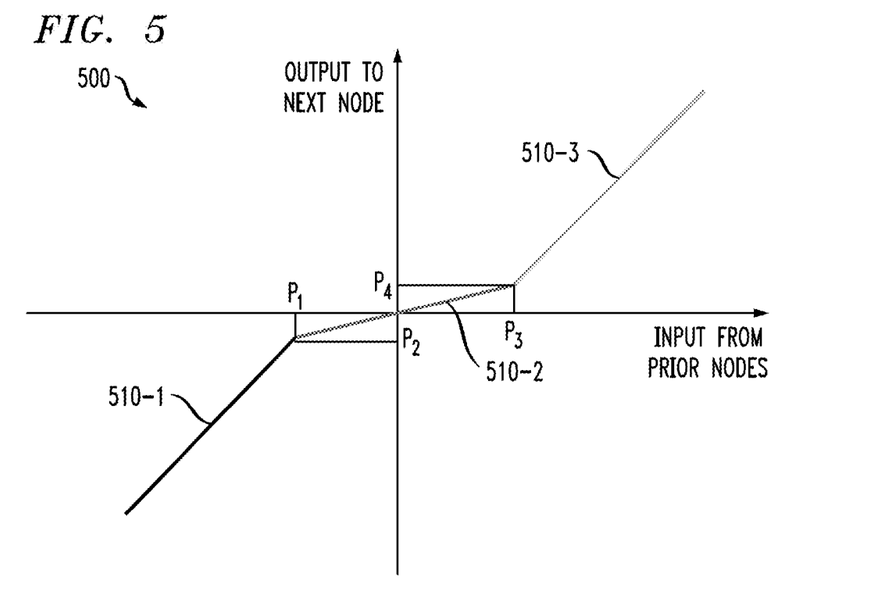
FIG. 5 illustrates a biangular activation function of FIG. 4, according to at least one embodiment.

As discussed hereinafter, the exemplary BILU activation function 500 comprises four learned parameters and optionally offers the advantage of emulating several types of existing activation functions. During the training process, the DNN learns the parameters of the BILU activation function 500 so that it typically converges to the substantially best activation function among the classes that BILU generalizes, as discussed further below in conjunction with FIGS. 7 and 8, for example.

The DNN architecture 410 (e.g., the number of hidden layers and the number of neurons in each layer) and the exemplary BILU activation function 500 (including any parameters to be learned in this activation function 500) in the exemplary embodiment of FIG. 4 are applied as an untrained DNN model 420 (e.g., with a finite number of weights). As shown in FIG. 4, the exemplary untrained DNN model 420 comprises an input layer 422, a plurality of hidden layers 424-1 through 424-$n$, and an output layer 428, in a known manner. Each of the hidden layers 424-1 through 424-$n$ comprises a corresponding BILU layer 426-1 through 426-$n$.

The untrained DNN model 420 is trained using past execution snapshots 430, such as the snapshots 150 of FIG. 1 from past executions used as training samples, to generate a trained DNN model 435. The trained DNN model 435 is a DNN model where the weights have been trained. As shown in FIG. 4, the weights of the trained DNN model 435 can optionally undergo additional training in an iterative process 490, to enable a continuously evolving DNN model.

As shown in FIG. 4, a running workflow 450 comprises a new workflow instance that is being executed in real-time and monitored. Snapshots 460 comprise run-time snapshots of the running workflow 450 (e.g., used as observation samples for the prediction).

The exemplary snapshots 460 of the running workflow 450 are processed by the time-to-finish predictor 200 during step 470 to predict a future state of the running workflow 450, such as a time-to-finish of one or more tasks. In this manner, run-time snapshots 460 and the trained DNN model 435 are used to make predictions for the future state of the running workflow 450 and thereby predict a time to finish, or another metric of interest.

Finally, the predicted future state is processed during step 480 to define a substantially best action (e.g., make decisions about the execution environment of the workflow, such as allocating more resources in order to finish the workflow faster).

FIG. 5 illustrates a biangular activation function 500 of FIG. 4, according to at least one embodiment. As noted above, the exemplary implementation of the biangular activation function 500 is referred to herein as a BILU. As shown in FIG. 5, the exemplary biangular activation function 500 is comprised of three lines 510-1 through 510-3, defined by four parameters $P_1$, $P_2$, $P_3$ and $P_4$. The parameters $P_1$, $P_2$, $P_3$ and $P_4$ are learned during the training phase of the DNN, as discussed above in conjunction with FIG. 4. Alternatively, the parameters $P_1$, $P_2$, $P_3$ and $P_4$ can be fixed during an initialization phase if a priori information is available about the domain. The BILU name comes from the fact that this function has two angles between the three lines 510-1 through 510-3 that are learned during the training process as shown in FIG. 5.

The exemplary biangular activation function 500 can be expressed, as follows:

$$BILU(x) = \begin{cases} x + (P_2 - P_1) & \text{if } x \le P_1, \\ \frac{P_4 - P_2}{P_3 - P_1}(x - P_1) + P_2 & \text{if } P_1 < x < P_3. \\ x + (P_4 - P_3) & \text{if } x \ge P_3 \end{cases}$$

The restricted number of learned parameters of the biangular activation function 500 of FIG. 5 is an advantage of the activation function, as it configures a good tradeoff of generalization for speed of convergence in training. In addition, the biangular activation function 500 of FIG. 5 is relatively easy to implement in deep learning frameworks.

BILU Generalizes Several Activation Functions with Low Parameter Cost

As discussed above, the disclosed biangular activation function 500 is determined in some embodiments with four parameters $P_1$, $P_2$, $P_3$ and $P_4$. These parameters $P_1$, $P_2$, $P_3$ and $P_4$ control the position and slope of the angles in the function. Through the adjustment of these parameters during training (given, for example, a particular DNN architecture and past and present snapshots), the disclosed biangular activation function 500 can emulate several typical activation functions.

As noted above, BILU is a generalization of existing activation functions such as the ReLU, but with adaptable sensitivity to input values close to zero. In addition, the disclosed biangular activation function 500 can be viewed as a constrained case of what is often considered a most general Adaptive Piecewise Linear function, trading off some generalization for faster convergence due to a smaller number of learned parameters.

Figure 6:
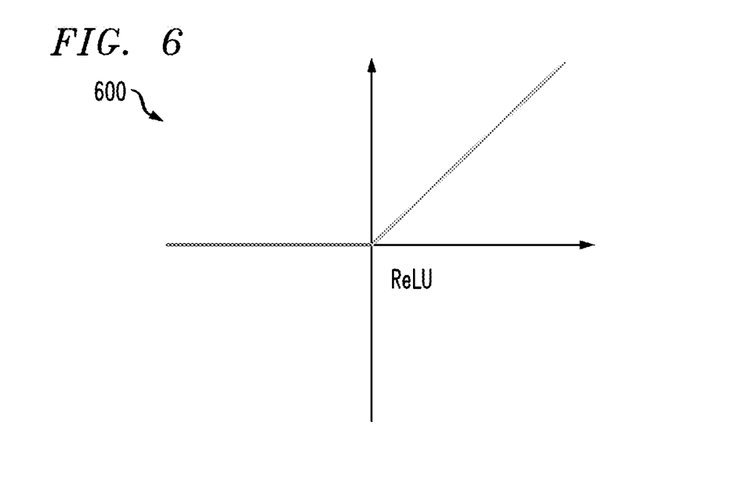
FIGS. 6 through 8 illustrate an emulation of a number of additional activation functions by the disclosed biangular activation function of FIG. 5, according to various embodiments of the disclosure.

FIG. 6 illustrates an emulation of a ReLU activation function 600 by the disclosed biangular activation function 500 of FIG. 5, according to one embodiment of the disclosure. The disclosed biangular activation function 500 emulates the ReLU activation function 600 by setting the parameters of the biangular activation function 500, as follows:

$P_1 = -\infty$, $P_2 = 0$, $P_3 = 0$ and $P_4 = 0$.

In the example of FIG. 6, the BILU function provides a generalization of the ReLU activation function 600, by setting one of the parameters as an infinite value, although in practice very high values would suffice, as would be apparent to a person of ordinary skill in the art. As noted above, for the representation of a biangular activation function substantially equivalent to an ReLU, the parameters of BILU are $P_1=-\infty$, $P_2=0$, $P_3=0$ and $P_4=0$.

Figure 7:
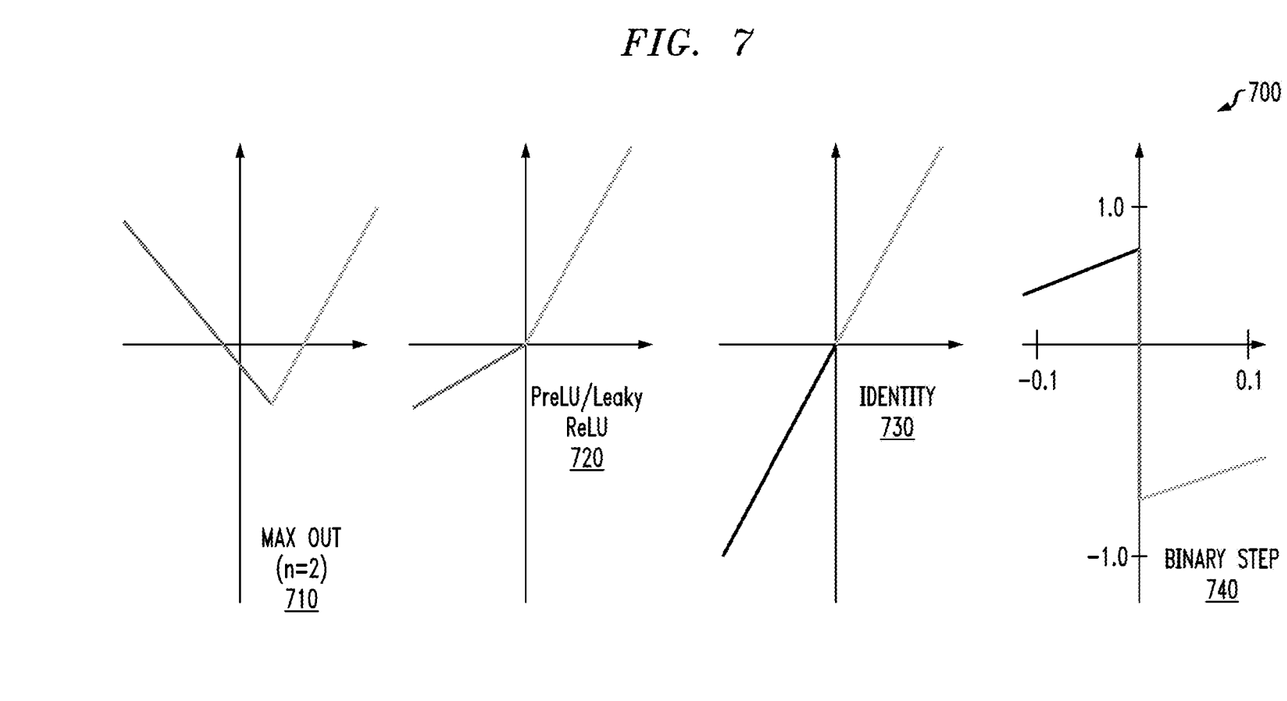

FIG. 7 illustrates an emulation 700 of additional exemplary activation functions 710, 720, 730, 740 by the disclosed biangular activation function 500 of FIG. 5, according to some embodiments of the disclosure. As shown in FIG. 7, the exemplary biangular activation function 500 can emulate, for example, a well-known Maxout activation function 710 (e.g., where n equals 2) (where a maxout activation function provides as output the maximum of the input values), a PreLU/Leaky ReLU activation function 720, an Identity activation function 730 and a Binary step activation function 740 (although the Binary step activation function 740 is approximated only near zero).

Generally, the additional exemplary activation functions 710, 720, 730, 740 of FIG. 7 are emulated by the disclosed biangular activation function 500 by varying the parameters $P_1$, $P_2$, $P_3$ and $P_4$ of the disclosed biangular activation function 500, as would be apparent to a person of ordinary skill in the art.

For a more detailed discussion of exemplary activation functions and DNN techniques, see, for example, X. Glorot et al., "Deep Sparse Rectifier Neural Networks," AISTATS, 2011; A. Forest et al., "Learning Activation Functions to Improve Deep Neural Networks," arXiv preprint, 2014; and/or D. P. KINGMA and J. A. BA, "Adam: A Method for Stochastic Optimization," arXiv preprint, 2014, each incorporated by reference herein in their entirety.

Figure 8:
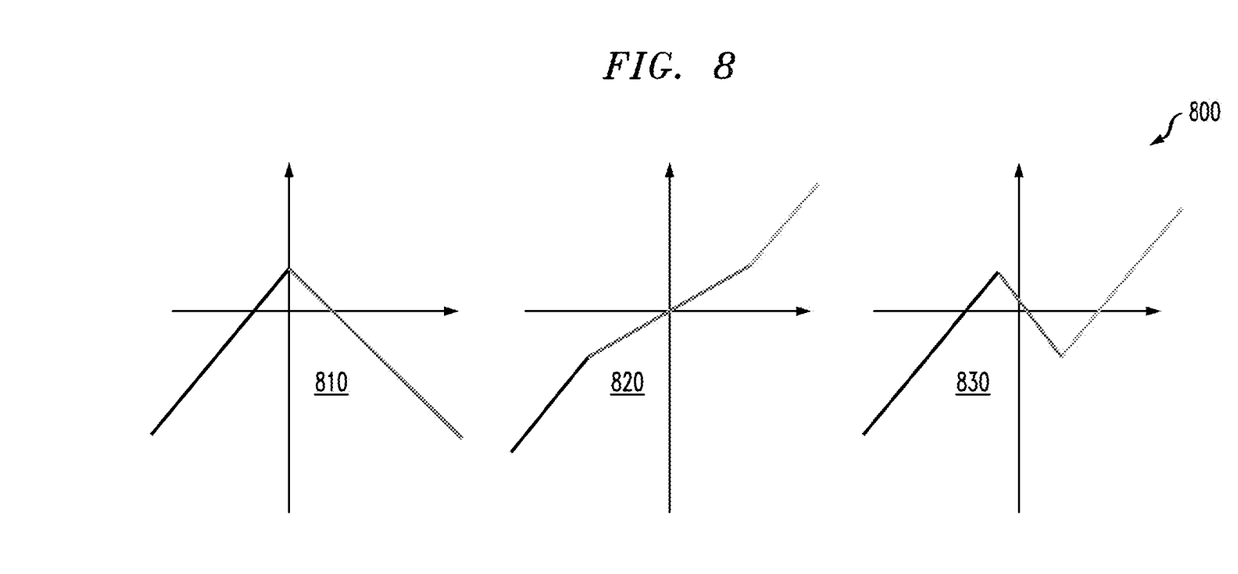

FIG. 8 illustrates an emulation 800 of further exemplary activation functions 810, 820, 830 by the disclosed biangular activation function 500 of FIG. 5, according to additional embodiments of the disclosure. As shown in FIG. 8, the exemplary biangular activation function 500 can emulate, for example, exemplary activation functions 810, 820, 830 that cannot be approximated by simpler functions.

Generally, the additional exemplary activation functions 810, 820, 830 of FIG. 8 are emulated by the disclosed biangular activation function 500 by varying the parameters $P_1$, $P_2$, $P_3$ and $P_4$ of the disclosed biangular activation function 500.

It has been found that the disclosed biangular activation function 500 represents a desirable tradeoff between generality and the number of parameters. A smaller number of parameters exhibited by the disclosed biangular activation function 500 impacts both the convergence time for the problem of prediction of time-to-finish in the context of workflow optimization, as well as the ease of implementation in deep learning frameworks.

In this manner, the disclosed biangular activation function 500 emulates several activation functions, such as the activation functions shown in FIGS. 6 through 8, with low complexity, permitting a learning of the substantially best activation function during the training phase. One important aspect of the use of the biangular function layer in the context of workflow optimization is the fact that the biangular function layer learns the substantially best shape for the activation cost. Although rectified linear units, such as PReLU, are more specific functions capable of representing a subset of the cases captured by the disclosed biangular activation function 500, the disclosed biangular activation function 500 represents a desirable tradeoff between generality and the number of parameters of the disclosed biangular activation function 500.

The telemetry data used for neural network training generally comprises noises of unknown variance. Thus, a single anomalous sample can cause convergence problems in the network learning optimization algorithm. This type of problem is usually solved with global parameters that control the learning rate in the optimization algorithm. In this sense, the disclosed biangular activation function 500 solves the problem locally. As the disclosed biangular activation function 500 adapts, the line 510-2 (FIG. 5) defined between the parameters $P_1$ and $P_3$ is able to adjust the gradient value and thus adapt locally in each neuron to the unknown levels of noise. Thus, if the error variance is large, the derivative will be low so that a single anomalous sample is not able to greatly modify the value of the network weights and thereby increasing the noise resistance. On the other hand, in a scenario with low noise data, the disclosed biangular activation function 500 will adapt the gradient to a large value and the model will converge quickly.

Among other benefits, the disclosed biangular activation function 500, in some embodiments, promotes an increase in efficiency of deep machine learning and deep reinforcement learning applications for the workflow optimization problem by reducing the convergence time and increasing the prediction capability of the DNN models used in these approaches.

In one or more embodiments, a biangular activation layer, referred to in some embodiments as a BILU, is employed. The disclosed biangular activation function 500 presents favorable characteristics for the application in the domain of predicting the time-to-finish of workflows, such as a small number of learned parameters and an adaptable sensitivity to values close to zero, all the while generalizing activation functions such as the ReLU, LeakyRelu, Prelu, RReLU and, to some extent, the binary step function.

Further, in some embodiments, the convergence rate and the accuracy are increased for DNNs used in approaches in the context of the workflow optimization problem.

One or more embodiments of the disclosure provide improved methods, apparatus and computer program products for predicting a time-to-finish of at least one workflow in a shared computing environment using a DNN with a biangular activation function. The foregoing applications and associated embodiments should be considered as illustrative only, and numerous other embodiments can be configured using the techniques disclosed herein, in a wide variety of different applications.

It should also be understood that the disclosed time-to-finish prediction techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for predicting a time-to-finish of workflows may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based time-to-finish prediction engine 200, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based time-to-finish prediction platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. These platforms may also be used to implement at least portions of other information processing systems in other embodiments.

Figure 9:
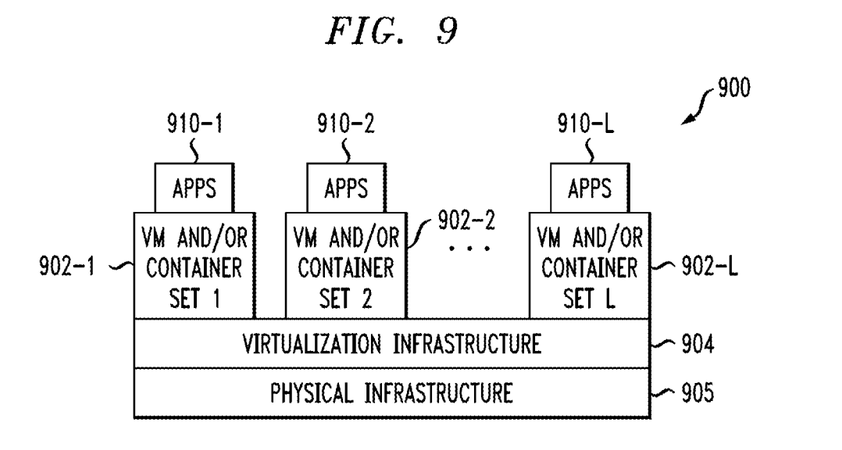
FIG. 9 illustrates an exemplary processing platform that may be used to implement at least a portion of one or more embodiments of the disclosure comprising a cloud infrastructure.

FIG. 9 shows an example processing platform comprising cloud infrastructure 900. The cloud infrastructure 900 comprises a combination of physical and virtual processing resources that may be utilized to implement at least a portion of the time-to-finish predictor 200. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide time-to-finish prediction functionality of the type described above for one or more processes running on a given one of the VMs. For example, each of the VMs can implement time-to-finish prediction control logic and associated time-to-finish prediction functionality for one or more processes running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide time-to-finish prediction functionality of the type described above for one or more processes running on different ones of the containers. For example, a container host device supporting multiple containers of one or more container sets can implement one or more instances of time-to-finish prediction control logic and associated time-to-finish prediction neural networks for use in generating time-to-finish estimates.

As is apparent from the above, one or more of the processing modules or other components of the time-to-finish predictor 200 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises at least a portion of the given system and includes a plurality of processing devices, denoted 1002-1, 1002-2, 1002-3, . . . 1002-K, which communicate with one another over a network 1004. The network 1004 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an application specific integrated circuit (ASIC), a field programmable gate array (FPGA) or other type of processing circuitry, as well as portions or combinations of such circuitry elements, and the memory 1012, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Figure 10:
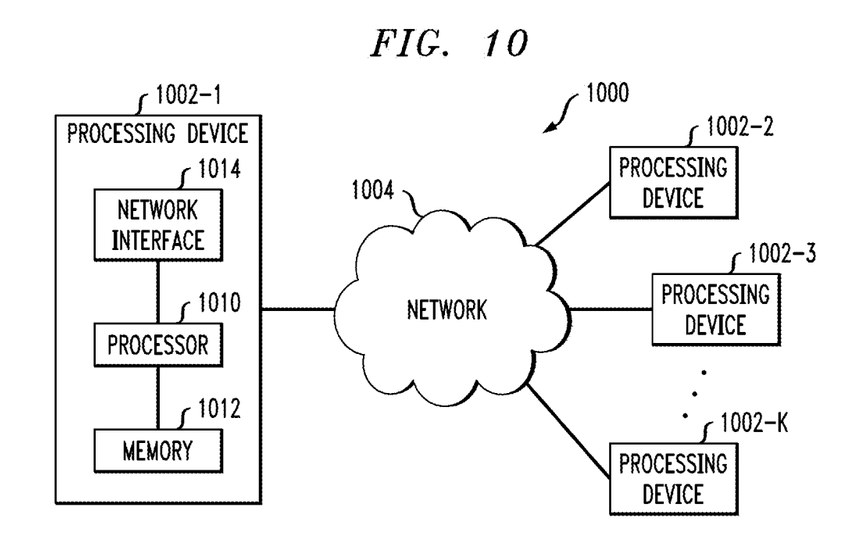
FIG. 10 illustrates another exemplary processing platform that may be used to implement at least a portion of one or more embodiments of the disclosure.

Multiple elements of an information processing system may be collectively implemented on a common processing platform of the type shown in FIG. 9 or 10, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a specification of at least one executing workflow of a plurality of concurrent workflows in a shared computing environment, wherein the specification comprises a plurality of states of past executions of the at least one executing workflow on at least one processing device;
obtaining at least one trained deep neural network, wherein said at least one trained deep neural network is trained to predict one or more future states of the at least one executing workflow using the plurality of states of past executions and wherein said at least one trained deep neural network employs a biangular activation function comprising a substantially minimal number of parameters that define a position and a slope associated with two angles of the biangular activation function for a range of input values; and
estimating, using at least one processing device and the at least one trained deep neural network, a time-to-finish of the at least one executing workflow of the plurality of concurrent workflows.

2. The method of claim 1, wherein the substantially minimal number of parameters comprise four parameters learned during a training phase.

3. The method of claim 1, wherein the substantially minimal number of parameters comprise four parameters fixed during an initialization phase based on a priori information.

4. The method of claim 1, further comprising the step of updating the at least one trained deep neural network using one or more snapshots collected during an execution of a new instance of the at least one executing workflow.

5. The method of claim 1, wherein the time-to-finish of the at least one executing workflow is used to update an execution environment of the at least one workflow.

6. The method of claim 4, wherein the updating of the execution environment of the at least one workflow comprises updating an allocation of resources for the at least one workflow.

7. The method of claim 1, wherein the biangular activation function adapts locally to a level of noise in one or more input values.

8. A computer program product, comprising a non-transitory machine-readable storage medium having encoded therein executable code of one or more software programs, wherein the one or more software programs when executed by at least one processing device perform the following steps:

obtaining a specification of at least one executing workflow of a plurality of concurrent workflows in a shared computing environment, wherein the specification comprises a plurality of states of past executions of the at least one executing workflow on at least one processing device;

obtaining at least one trained deep neural network, wherein said at least one trained deep neural network is trained to predict one or more future states of the at least one executing workflow using the plurality of states of past executions and wherein said at least one trained deep neural network employs a biangular activation function comprising a substantially minimal number of parameters that define a position and a slope associated with two angles of the biangular activation function for a range of input values; and  estimating, using the at least one trained deep neural network, a time-to-finish of the at least one executing workflow of the plurality of concurrent workflows.

9. The computer program product of claim 8, wherein the substantially minimal number of parameters comprise four parameters learned during a training phase.

10. The computer program product of claim 8, wherein the substantially minimal number of parameters comprise four parameters fixed during an initialization phase based on a priori information.

11. The computer program product of claim 8, further comprising the step of updating the at least one trained deep neural network using one or more snapshots collected during an execution of a new instance of the at least one executing workflow.

12. The computer program product of claim 8, wherein the time-to-finish of the at least one executing workflow is used to update an execution environment of the at least one workflow.

13. The computer program product of claim 8, wherein the biangular activation function adapts locally to a level of noise in one or more input values.

14. An apparatus, comprising:
a memory; and
at least one processing device, coupled to the memory, operative to implement the following steps:

obtaining a specification of at least one executing workflow of a plurality of concurrent workflows in a shared computing environment, wherein the specification comprises a plurality of states of past executions of the at least one executing workflow on at least one processing device;

obtaining at least one trained deep neural network, wherein said at least one trained deep neural network is trained to predict one or more future states of the at least one executing workflow using the plurality of states of past executions and wherein said at least one trained deep neural network employs a biangular activation function comprising a substantially minimal number of parameters that define a position and a slope associated with two angles of the biangular activation function for a range of input values; and  estimating, using the at least one trained deep neural network, a time-to-finish of the at least one executing workflow of the plurality of concurrent workflows.

15. The apparatus of claim 14, wherein the substantially minimal number of parameters comprise four parameters learned during a training phase.

16. The apparatus of claim 14, wherein the substantially minimal number of parameters comprise four parameters fixed during an initialization phase based on a priori information.

17. The apparatus of claim 14, further comprising the step of updating the at least one trained deep neural network using one or more snapshots collected during an execution of a new instance of the at least one executing workflow.

18. The apparatus of claim 14, wherein the time-to-finish of the at least one executing workflow is used to update an execution environment of the at least one workflow.

19. The apparatus of claim 18, wherein the updating of the execution environment of the at least one workflow comprises updating an allocation of resources for the at least one workflow.

20. The apparatus of claim 14, wherein the biangular activation function adapts locally to a level of noise in one or more input values.

\* \* \* \* \*